United States Patent
Yoshimoto et al.

(10) Patent No.: US 8,977,434 B2
(45) Date of Patent: Mar. 10, 2015

(54) VEHICLE ATTITUDE CONTROL SYSTEM

(71) Applicant: JTEKT Corporation, Osaka-shi, Osaka (JP)

(72) Inventors: Hiroshi Yoshimoto, Nara (JP); Shuuji Kimura, Kashihara (JP); Masayasu Higashi, Kashihara (JP)

(73) Assignee: JTEKT Corporation, Osaka (JP)

( * ) Notice: Subject to any disclaimer, the term of this patent is extended or adjusted under 35 U.S.C. 154(b) by 162 days.

(21) Appl. No.: 13/630,450

(22) Filed: Sep. 28, 2012

(65) Prior Publication Data

US 2013/0090810 A1 Apr. 11, 2013

(30) Foreign Application Priority Data

Oct. 6, 2011 (JP) .................................. 2011-222272

(51) Int. Cl.
   *B62D 6/00* (2006.01)
   *B60K 28/16* (2006.01)
   *B60T 8/1755* (2006.01)

(52) U.S. Cl.
   CPC ......... *B60T 8/17552* (2013.01); *B60T 2201/16* (2013.01); *B60T 2230/02* (2013.01)
   USPC ............................................. 701/41; 180/197

(58) Field of Classification Search
   CPC ............ B60T 2220/00; B60T 2220/02; B60T 2220/03; B60T 2220/04
   USPC ...................... 701/6.2, 41; 180/197
   See application file for complete search history.

(56) References Cited

U.S. PATENT DOCUMENTS

| | | | | |
|---|---|---|---|---|
| 5,455,770 | A * | 10/1995 | Hadeler et al. | 701/70 |
| 6,195,606 | B1 * | 2/2001 | Barta et al. | 701/70 |
| 6,415,215 | B1 | 7/2002 | Nishizaki et al. | |
| 7,509,194 | B2 * | 3/2009 | Wheals et al. | 701/36 |
| 2002/0147532 | A1 | 10/2002 | Inagaki et al. | |
| 2003/0191572 | A1 | 10/2003 | Roll et al. | |
| 2004/0267428 | A1 | 12/2004 | Knoop et al. | |
| 2009/0030561 | A1 | 1/2009 | Gurieff et al. | |
| 2010/0268420 | A1 * | 10/2010 | Yasui et al. | 701/41 |
| 2011/0054738 | A1 * | 3/2011 | Savaresi et al. | 701/41 |

FOREIGN PATENT DOCUMENTS

| | | |
|---|---|---|
| DE | 102 08 418 A1 | 10/2002 |
| WO | WO 01/81139 A1 | 11/2001 |
| WO | WO 2006/099662 A1 | 9/2006 |

OTHER PUBLICATIONS

Jan. 22, 2013 European Search Report issued in Application No. 12187197.4.

* cited by examiner

*Primary Examiner* — Fadey Jabr
*Assistant Examiner* — Aaron Troost
(74) *Attorney, Agent, or Firm* — Oliff PLC

(57) ABSTRACT

A target sideslip angle computing unit calculates a target sideslip angle used when a vehicle makes a turn, based on a steering angle and a vehicle speed. A target sideslip angle correcting unit corrects the target sideslip angle calculated by the target sideslip angle computing unit using a sideslip angle correction amount calculated based on at least one of a steering angular velocity, a depression amount of an accelerator pedal, a depression velocity of the accelerator pedal and a depression amount of a brake pedal. Vehicle attitude control is executed using the target sideslip angle corrected by the target sideslip angle correcting unit.

8 Claims, 5 Drawing Sheets

VEHICLE ATTITUDE CONTROL SYSTEM

INCORPORATION BY REFERENCE/RELATED APPLICATION

This application claims priority to Japanese Patent Application No. 2011-222272 filed on Oct. 6, 2011 the disclosure of which, including the specification, drawings and abstract, is incorporated herein by reference in its entirety.

BACKGROUND OF THE INVENTION

1. Field of the Invention

The invention relates to a vehicle attitude control system that stabilizes the vehicle behavior.

2. Discussion of Background

U.S. Pat. No. 6,415,215 B1 describes an electronic vehicle attitude control mechanism (electronic stability control) that prevents a sideslip of a vehicle. If a sideslip of the vehicle is sensed when a sudden steering operation is performed or while the vehicle is travelling on a slippery road, the electronic vehicle attitude control mechanism automatically applies brakes to respective wheels individually to stop the sideslip.

The electronic vehicle attitude control mechanism collects information from various sensors which detect, for example, a vehicle speed, a lateral acceleration of the vehicle, and a yaw rate, detects an unstable vehicle state, and then executes, for example, brake control over the individual wheels, and engine output control. In this way, the electronic vehicle attitude control mechanism corrects the travelling direction of the vehicle.

Specifically, when the vehicle understeers, a vehicle yaw moment toward the turning inner side is generated by making the braking force applied to the turning inner wheels larger than the braking force applied to the turning outer wheels. On the other hand, when the vehicle oversteers, a vehicle yaw moment toward the turning outer side is generated by making the braking force applied to the turning outer wheels larger than the braking force applied to the turning inner wheels. In this way, the vehicle behavior is stabilized.

In the related art, in order to detect a vehicle state, a target yaw rate or a target vehicle body sideslip angle is computed based on the information collected from the various sensors. However, an operation amount of a member operated by a driver is not taken into account.

SUMMARY OF THE INVENTION

The invention provides a vehicle attitude control system that allows a vehicle to turn as intended by a driver, by executing vehicle attitude control by taking into account, for example, a pedal depression amount and a steering wheel operation amount.

According to a feature of an example of the invention, a target sideslip angle computing unit calculates a target sideslip angle used when a vehicle makes a turn, on the basis of a steering angle and a vehicle speed, a target sideslip angle correcting unit corrects the target sideslip angle calculated by the target sideslip angle computing unit using a sideslip angle correction amount calculated based on at least one of a steering angular velocity, a depression amount of an accelerator pedal, a depression velocity of the accelerator pedal and a depression amount of a brake pedal, and vehicle attitude control is executed using the target sideslip angle corrected by the target sideslip angle correcting unit.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, an embodiment of the invention will be described with reference to the accompanying drawings.

Figure 1:
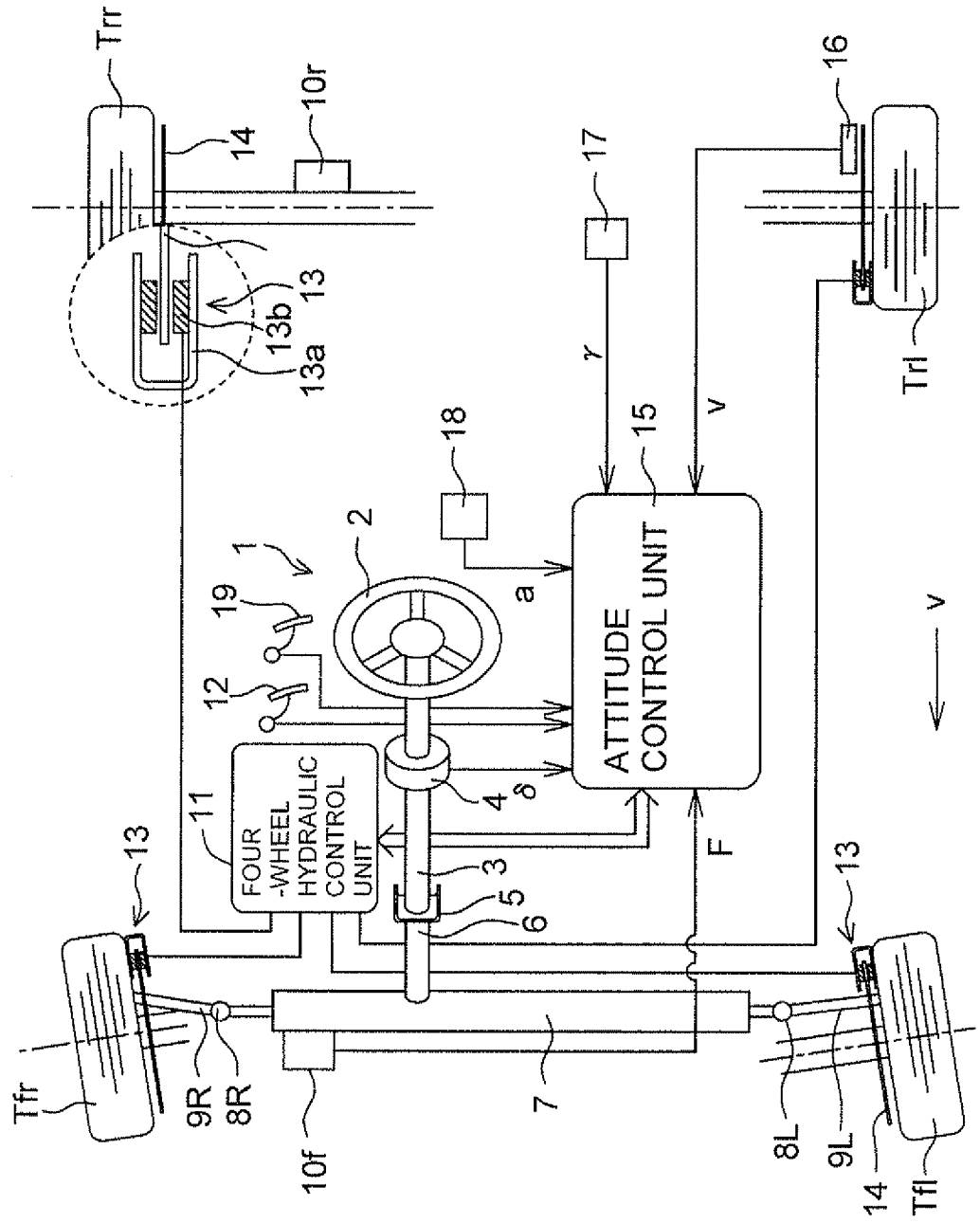
FIG. 1 is a schematic view that shows the schematic configuration of a vehicle attitude control system according to an embodiment of the invention.

FIG. 1 is a schematic view that shows the schematic configuration of a vehicle attitude control system 1. The vehicle attitude control system 1 includes a steering member 2, such as a steering wheel, and a steering shaft 3 coupled to the steering member 2 so as to be rotatable together with the steering member 2. A steering angle sensor 4 is provided on the steering shaft 3. The steering angle sensor 4 detects a steering angle δ of the steering member 2. The steering angle sensor 4 is a sensor that detects a rotation angle of the steering shaft 3, for example, by detecting a multipolar magnet with the use of, for example, a magnetic induction element. The multipolar magnet is attached on the circumference of the steering shaft 3 connected to the steering member 2. The steering member 2 is connected to one end of the steering shaft 3, and the other end is coupled to a universal joint 5 and is further coupled to front tires Tfr, Tfl via a steering mechanism.

The steering mechanism includes a pinion shaft 6, a rack shaft 7 and knuckle arms 9R, 9L. The rack shaft 7 is in mesh with a pinion formed at the distal end of the pinion shaft 6, and serves as a steered shaft that extends in the lateral direction of a vehicle. The knuckle arms 9R, 9L are respectively coupled to a pair of end portions of the rack shaft 7 via tie rods 8R, 8L. The reference numeral "10f" denotes an axial force sensor that is used to detect a lateral axial force applied to the rack shaft 7. The reference numeral "10r" denotes an axial force sensor that is used to detect a strain based on the difference between a tensile stress and a compressive stress that occur in an axle of rear wheels.

A steering assist electric motor (not shown) is coupled to the steering shaft 3 or the rack shaft 7 via a gear device. Steering assist force is supplied by the steering assist electric motor.

An accelerator pedal 19 is provided with a displacement sensor that detects a depression amount of the accelerator pedal 19. The displacement sensor transmits a signal indicating the depression amount to an attitude control unit 15. The attitude control unit 15 thus acquires the depression amount of the accelerator pedal 19.

A brake pedal 12 is provided with a displacement sensor that detects a depression amount of the brake pedal 12. The displacement sensor transmits a signal indicating the depression amount to the attitude control unit 15. The attitude control unit 15 thus acquires the depression amount of the brake pedal 12.

Note that, instead of a signal from the displacement sensor, there may be used signals that are input into a four-wheel hydraulic control unit 11 and that indicate brake pressures applied to the respective wheels, which correspond to depression force applied to the brake pedal 12. The signals indicating the brake pressures are transmitted from the four-wheel hydraulic control unit 11 to the attitude control unit 15. Thus, the attitude control unit 15 acquires the depression amount of the brake pedal 12.

The vehicle attitude control system 1 includes the four-wheel hydraulic control unit 11 that is used to apply brakes to the right and left front wheels and the right and left rear wheels of the vehicle. The four-wheel hydraulic control unit 11 generates brake pressures for the respective wheels based on the depression force applied to the brake pedal 12, with the use of a master cylinder. The brake pressures are distributed from the four-wheel hydraulic control unit 11 to brake devices 13 for the respective wheels as wheel cylinder pressures, and cause the respective brake devices 13 to apply braking forces to the wheels.

An enlarged view of the structure of the brake device 13 is shown in a broken-line circle at a rear tire Trr in FIG. 1. The brake device 13 is configured to generate braking force when brake pads 13b fitted to the inner faces of a caliper 13a are pushed against a rotor 14 of the wheel.

The four-wheel hydraulic control unit 11 is connected to the attitude control unit 15 formed of a computer. The steering angle sensor 4 and the axial force sensors 10, which are described above, a wheel speed sensor 16, a yaw rate sensor 17 and a lateral acceleration sensor 18 are connected to the attitude control unit 15. The wheel speed sensor 16 detects the wheel rotation speed. The yaw rate sensor 17 is attached to a vehicle body. The lateral acceleration sensor 81 is also attached to the vehicle body. The wheel speed sensor 16 is a sensor that reads a rotation speed of the rotor 14 of the wheel, and detects a vehicle speed v by multiplying the read rotation speed by the effective rotation radius of the tire. The yaw rate sensor detects a rotation angular velocity (yaw rate) of the vehicle. The lateral acceleration sensor detects an acceleration applied in the lateral direction of the vehicle.

The attitude control unit 15 calculates a target vehicle body sideslip angle (a vehicle body sideslip angle is an angle between the velocity vector of the vehicle and the longitudinal axis of the vehicle; hereinafter, simply referred to as "sideslip angle") $\beta^*$ on the basis of the vehicle speed v detected by the wheel speed sensor 16 and the steering angle $\delta$ detected by the steering angle sensor 4. Then, the attitude control unit 15 determines brake pressures that are distributed to the rear wheels on the basis of the difference between the target sideslip angle $\beta^*$ and an actual sideslip angle $\beta$ estimated with the use of the yaw rate sensor 17 and the lateral acceleration sensor 18, and provides signals indicating the determined brake pressures to the four-wheel hydraulic control unit 11.

In the present embodiment, the steering angle $\delta$ takes a positive value when the steering member 2 is turned to the left with respect to the neutral position, and takes a negative value when the steering member 2 is turned to the right with respect to the neutral position. The vehicle body sideslip angle $\beta$ takes a positive value when the vehicle body is oriented to the left with respect to the neutral position, and takes a negative value when the vehicle body is oriented to the right with respect to the neutral position. Thus, it is possible to individually set braking forces that are applied to the rear wheels by correcting the brake pressures for the four wheels, which are set on the basis of depression force applied to the brake pedal 12.

Figure 2:
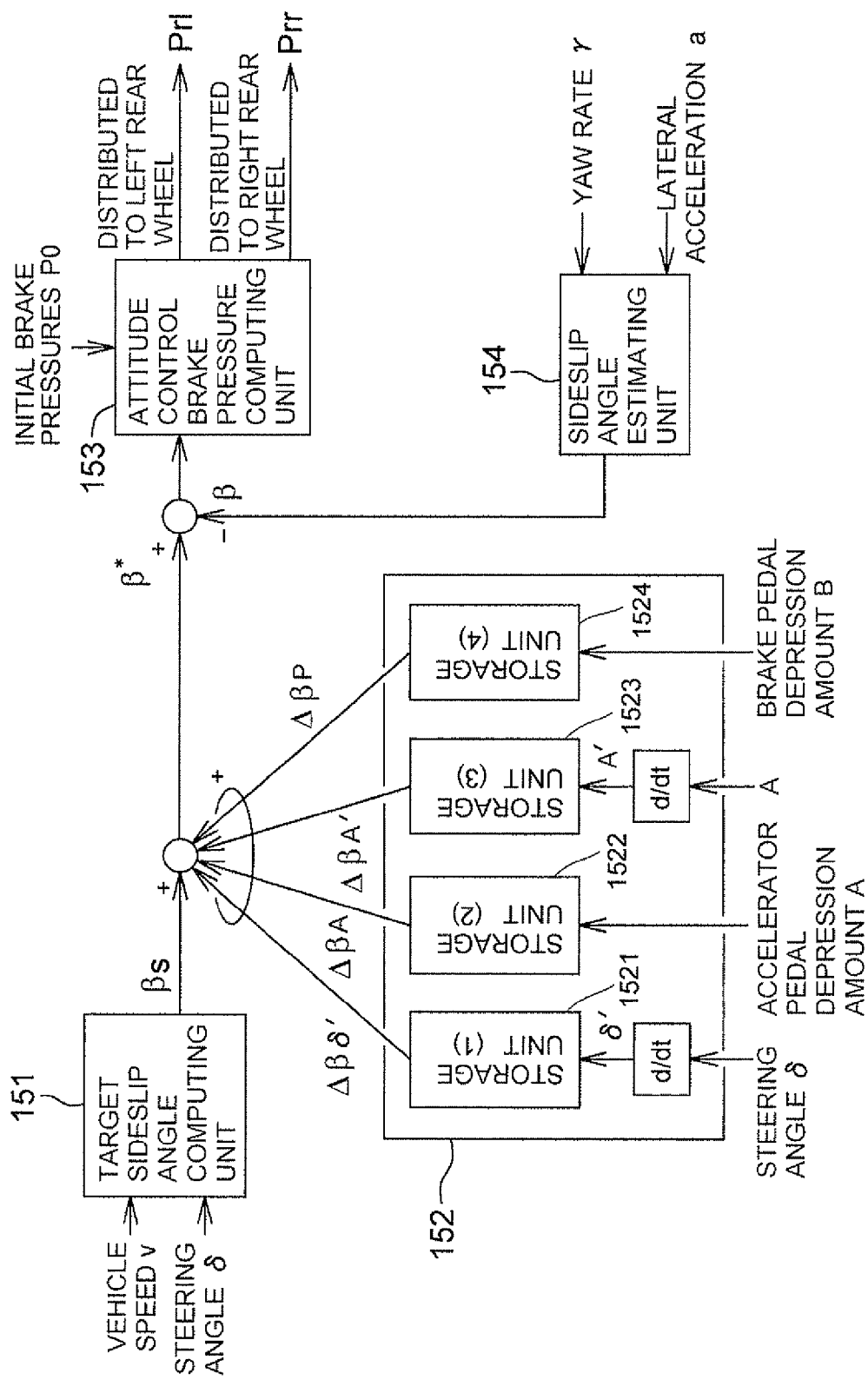
FIG. 2 is a control block diagram of an attitude control unit 15.

FIG. 2 shows a control block diagram of the attitude control unit 15. The attitude control unit 15 includes a target sideslip angle computing unit 151 and a target sideslip angle correcting unit 152. The target sideslip angle computing unit 151 computes a target sideslip angle $\beta s$ on the basis of the vehicle speed v acquired from the wheel speed sensor 16 and the steering angle $\delta$ acquired from the steering angle sensor 4. The target sideslip angle correcting unit 152 includes four storage units 1521 to 1524. Equations for the target sideslip angle $\beta s$ will be described later.

The target sideslip angle $\beta s$ computed by the target sideslip angle computing unit 151 is corrected by the target sideslip angle correcting unit 152 on the basis of a steering angular velocity $\delta'$ that is the temporal differentiation of the steering angle $\delta$, a depression amount A of the accelerator pedal, a temporal differentiation (depression velocity) A' of the depression amount of the accelerator pedal, and a brake pressure P calculated based on a depression amount of the brake pedal, as shown in FIG. 2.

The target sideslip angle correcting unit 152 stores a prescribed map indicating the correlation between a steering angular velocity $\delta'$ and a sideslip angle correction amount $\Delta\beta\delta'$ in the storage unit 1521. The target sideslip angle correcting unit 152 obtains a steering angular velocity $\delta'$ by subjecting the steering angle $\delta$ to temporal differentiation, and applies the steering angular velocity $\delta'$ to the above-described correlation to calculate a first sideslip angle correction amount $\Delta\beta\delta'$.

Figure 4A:
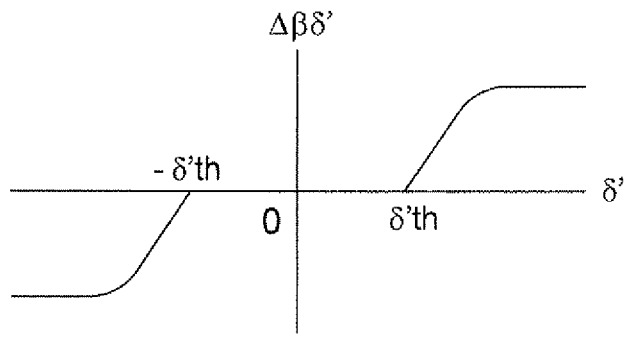
FIG. 4A to FIG. 4D are graphs that respectively show the correlation between a steering angular velocity and a sideslip angle correction amount, the correlation between a depression amount of an accelerator pedal and a sideslip angle correction amount, the correlation between a depression velocity of the accelerator pedal and a sideslip angle correction amount, and the correlation between a depression amount of a brake pedal and a sideslip angle correction amount.

The correlation is shown in a graph in FIG. 4A. In the graph, the sideslip angle correction amount $\Delta\beta\delta'$ is set to 0 when the steering angular velocity $\delta'$ falls within a range from a threshold $-\delta'$th to a threshold $\delta'$th, the sideslip angle correction amount $\Delta\beta\delta'$ is set to a positive predetermined value when the steering angular velocity $\delta'$ exceeds the threshold $\delta'$th in the positive direction, and the sideslip angle correction amount $\Delta\beta\delta'$ is set to a negative predetermined value when the steering angular velocity $\delta'$ exceeds the threshold $-\delta'$th in the negative direction.

Therefore, when the steering member 2 is quickly turned to the left and therefore the steering angular velocity $\delta'$ exceeds the threshold $\delta'$th, the target sideslip angle $\beta s$ increases in the positive direction (leftward). On the other hand, when the steering member 2 is quickly turned to the right and therefore the steering angular velocity $\delta'$ exceeds the threshold $-\delta'$th in the negative direction, the target sideslip angle $\beta s$ increases in the negative direction (rightward). That is, the target sideslip angle correcting unit 152 corrects the target sideslip angle $\beta s$ such that the vehicle body is oriented in a direction into which the steering member 2 is turned.

The sideslip angle correction is not executed when the steering angular velocity $\delta'$ falls within the range from the threshold $-\delta'$th to the threshold $\delta'$th. This is because, when the steering angular velocity $\delta'$ is low, a driver is not performing a sudden steering operation, a travelling state sufficiently falls within a driver controllable range, and it is determined that support to the vehicle attitude control is not necessary.

In addition, the target sideslip angle correcting unit 152 stores a prescribed map indicating the correlation between a depression amount A of the accelerator pedal 19 and a sideslip angle correction amount ΔβA in the storage unit 1522. The target sideslip angle correcting unit 152 calculates a second sideslip angle correction amount ΔβA by applying the measured depression amount A of the accelerator pedal 19 to the correlation.

Figure 4B:
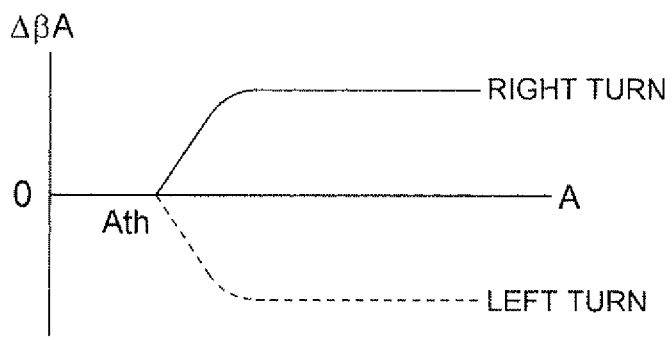

The correlation is shown in a graph in FIG. 4B. According to the graph, the sideslip angle correction amount ΔβA is set to 0 when the depression amount A of the accelerator pedal 19 is equal to or smaller than a threshold Ath. In the case where the vehicle is turning to the right, when the depression amount A of the accelerator pedal 19 increases beyond the threshold Ath, the target sideslip angle βs is increased in the positive direction to turn the vehicle relatively to the left. That is, the turning direction is brought closer to the straight-ahead direction.

In the case where the vehicle is turning to the left, when the depression amount A of the accelerator pedal 19 increases beyond the threshold Ath, the target sideslip angle βs is increased in the negative direction to turn the vehicle relatively to the right. That is, the turning direction is brought closer to the straight-ahead direction.

The sideslip angle correction is not executed when the depression amount A of the accelerator pedal 19 is equal to or smaller than the threshold Ath. This is because, when the depression amount A is small, the driver is not performing a sudden acceleration operation, a travelling state sufficiently falls within a driver controllable range, and it is determined that support to the vehicle attitude control is not necessary.

The sign of the sideslip angle correction amount ΔβA is changed depending on whether the vehicle is turning to the right or turning to the left (this also applies to the process executed based on a depression velocity of the accelerator pedal and the process executed based on a depression amount of the brake pedal). To determine whether the vehicle is turning to the right or turning to the left, a detection signal from the steering angle sensor 4, the yaw rate sensor 17 or the lateral acceleration sensor 18 is utilized.

In addition, the target sideslip angle correcting unit 152 stores a prescribed map indicating the correlation between a depression velocity A' of the accelerator pedal 19 and a sideslip angle correction amount ΔβA' in the storage unit 1523. The target sideslip angle correcting unit 152 calculates a third sideslip angle correction amount ΔβA' by applying the measured depression velocity A' of the accelerator pedal 19 to the correlation.

Figure 4C:
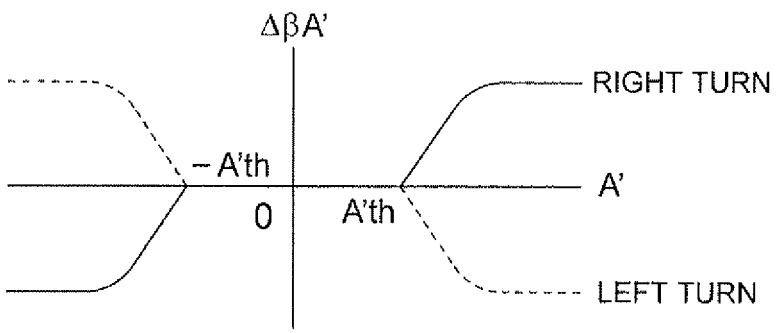

The correlation is shown in a graph in FIG. 4C. The sideslip angle correction amount ΔβA' is set to 0 when the depression velocity A' of the accelerator pedal 19 falls within a range from a threshold −A'th to a threshold A'th, the sideslip angle correction amount ΔβA' is set to a positive predetermined value when the depression velocity A' of the accelerator pedal 19 exceeds the threshold A'th in the positive direction, and the sideslip angle correction amount Δβδ' is set to a negative predetermined value when the depression velocity A' of the accelerator pedal 19 exceeds the threshold −A'th in the negative direction.

Therefore, in the case where the vehicle is turning to the right, when the depression velocity A' of the accelerator pedal 19 exceeds the threshold A'th, the target sideslip angle βs increases in the positive direction (leftward); whereas, when the accelerator pedal 19 is suddenly released and the depression velocity A' exceeds the threshold −A'th in the negative direction, the target sideslip angle βs increases in the negative direction (rightward). In the case where the vehicle is turning to the left, the sign of the sideslip angle correction amount ΔβA' is opposite to the sign as described above.

The sideslip angle correction is not executed when the depression velocity A' of the accelerator pedal 19 falls within the range from the threshold −A'th to the threshold A'th. This is because, when the depression velocity A' is low, the driver is not performing a sudden acceleration, a travelling state sufficiently falls within a driver controllable range, and it is determined that support to the vehicle attitude control is not necessary.

Furthermore, the target sideslip angle correcting unit 152 stores a prescribed map indicating the correlation between a depression amount B of the brake pedal 12 and a sideslip angle correction amount ΔβP in the storage unit 1524. the target sideslip angle correcting unit 152 calculates a fourth sideslip angle correction amount ΔβP by applying the measured depression amount B of the brake pedal 12 to the correlation.

Figure 4D:
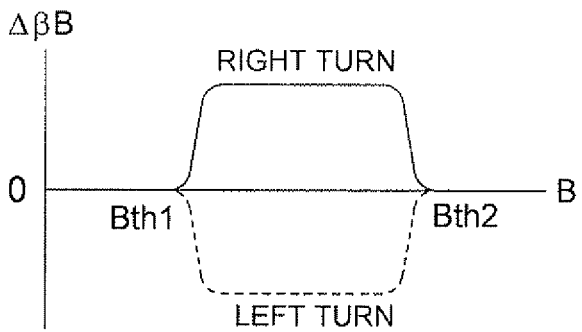

The correlation is shown in a graph in FIG. 4D. According to the graph, the sideslip angle correction amount ΔβP is set to 0 when the depression amount B of the brake pedal 12 is equal to or smaller than a first threshold Bth1. In the case where the vehicle is turning to the right, when the depression amount B of the brake pedal 12 increases beyond the first threshold Bth1, the target sideslip angle βs is increased in the positive direction to turn the vehicle relatively to the left. That is, the turning direction is brought closer to the straight-ahead direction.

In the case where the vehicle is turning to the left, when the depression amount B of the brake pedal 12 increases beyond the first threshold Bth1, the target sideslip angle βs is increased in the negative direction to turn the vehicle relatively to the right. That is, the turning direction is brought closer to the straight-ahead direction. Driver's depression of the brake pedal 12 is interpreted as an intention to turn by a larger amount, and it is possible to turn the vehicle in a direction closer to a predetermined direction according to the driver's intention.

The sideslip angle correction is not executed when the depression amount B of the brake pedal 12 is equal to or smaller than the first threshold Bth1. This is because, when the depression amount B of the brake pedal 12 is small, the driver is not performing a sudden deceleration operation, a travelling state sufficiently falls within a driver controllable range, and it is determined that support to the vehicle attitude control is not necessary.

Note that, in addition to the first threshold Bth1, a second threshold Bth2 is set. The second threshold Bth2 is larger than the first threshold Bth1. When the depression amount B of the brake pedal 12 increases beyond the second threshold Bth2, it is determined that driver's intention is to stop the vehicle. Therefore, the sideslip angle correction amount ΔβP is returned to 0 because the sideslip angle correction is not necessary.

The above-described sideslip angle correction amounts Δβδ', ΔβA, ΔβA' and ΔβP are designed values that are determined on the basis of the speed of the vehicle, the weight of the vehicle and the wheelbase of the vehicle.

Further, the attitude control unit 15 corrects the target sideslip angle β* according to Equation 1 indicated below.

$$\beta^* = \beta S + G\Delta\beta\delta' + H\Delta\beta A + I\Delta\beta A' + J\Delta\beta P \qquad \text{Equation 1}$$

Coefficients G, H, I and J are weighting coefficients for the sideslip angle correction amounts Δβδ', ΔβA, ΔβA' and ΔβP, respectively.

The attitude control unit 15 further includes an attitude control brake pressure computing unit 153 and a sideslip angle estimating unit 154. The attitude control brake pressure computing unit 153 obtains a difference (β−β*) between the corrected target sideslip angle β* and the estimated vehicle body sideslip angle β, and calculates brake pressures for attitude control on the basis of the difference (β−β*). The sideslip angle estimating unit 154 estimates an actual vehicle body sideslip angle β on the basis of a yaw rate γ detected by the yaw rate sensor and a lateral acceleration α detected by the lateral acceleration sensor.

A right rear wheel brake pressure and a left rear wheel brake pressure, which are calculated by the attitude control brake pressure computing unit 153, are distributed to the rear wheels to cause the vehicle body to turn. The turn is detected by the yaw rate sensor and the lateral acceleration sensor, and the vehicle body sideslip angle β is calculated by the sideslip angle estimating unit 154. The attitude control brake pressure computing unit 153 calculates brake pressures for attitude control on the basis of the difference (β−β*) between the vehicle body sideslip angle β and the target sideslip angle β*. Then, the attitude control brake pressure computing unit 153 executes feedback control such that the vehicle body sideslip angle β is brought to the target sideslip angle β*.

Figure 3:
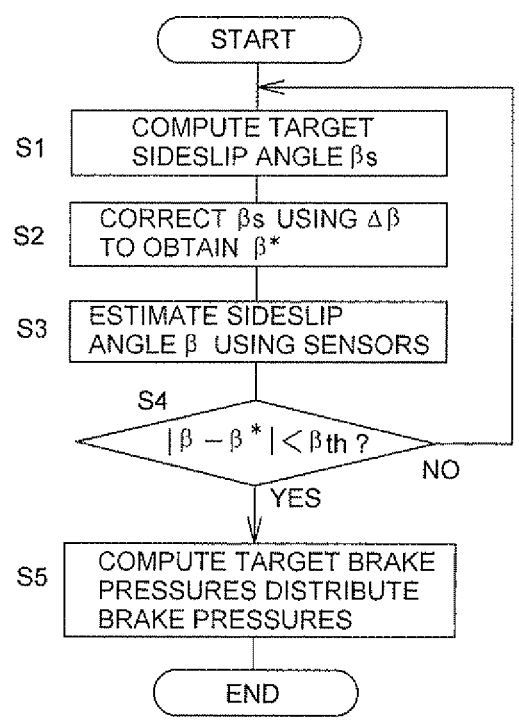
FIG. 3 is a flowchart for illustrating the overall procedure executed by the attitude control unit 15.

FIG. 3 is a flowchart for illustrating the overall procedure executed by the attitude control unit 15. The attitude control unit 15 calculates a target sideslip angle βs (step S1).

The equations for calculating the target sideslip angle βs are as follows. Here, m denotes a vehicle weight, v denotes a vehicle speed, L denotes a wheelbase (L=Lf+Lr), Lf denotes a distance between the center of gravity of the vehicle and a front axle, Lr denotes a distance between the center of gravity of the vehicle and a rear axle, Cf denotes a cornering power of the front wheel (the ratio of a lateral force on the tire near 0 degrees of tire sideslip angle to the tire sideslip angle), and Cr denotes a cornering power of the rear wheel.

$$\beta s = (A/B)(Lf/L)\delta \qquad \text{Equation 2}$$

A and B are respectively expressed as follows.

$$A = 1 - (m/2L)(Lf/LrCr)v^2 \qquad \text{Equation 3}$$

$$B = 1 - (m/2L^2)[(LfCf - LrCr)/CfCr]v^2 \qquad \text{Equation 4}$$

The attitude control unit 15 further calculates a corrected target sideslip angle β* (step S2). On the other hand, an actual vehicle body sideslip angle β is estimated based on the yaw rate γ detected by the yaw rate sensor and the lateral acceleration α detected by the lateral acceleration sensor, according to Equation 5 indicated below.

$$\beta = \int (-\gamma + \alpha) dt \qquad \text{Equation 5}$$

An integral range is from time immediately before the vehicle starts turning (at this time, γ, α and β are all 0) up to present time t during turning. Thus, it is possible to calculate the vehicle body sideslip angle β as a function of time t (step S3).

Note that the actual vehicle body sideslip angle β may also be calculated as follows using values detected by the axial force sensors 10, instead of using Equation 5, $$\beta = (1/L)[(LrFyf/Cf)(LfFyr/Cr) + Lr\delta] \qquad \text{Equation 6}$$

Here, Fyf is an axial force of the front wheel and Fyr is an axial force of the rear wheel. In the attitude control brake pressure computing unit 153, a difference (β−β*) between the target sideslip angle β* and the actual vehicle body sideslip angle β is calculated (step S4), and brake pressures for attitude control are calculated on the basis of the difference (β−β*) (step S5).

If it is determined in step S4 that the absolute value of the difference (β−β*), that is, |β−β*|, is smaller than a threshold βth that is used to determine whether to start attitude control, an attitude control brake pressure is not computed. In this case, brake pressure control is executed on the basis of only brake pressures (referred to as initial brake pressures) corresponding to driver's depression force applied to the brake pedal 12.

On the other hand, if it is determined that the absolute value of the difference (β−β*) is larger than the threshold βth, an attitude control brake pressure is computed (step S5). The attitude control brake pressure is a brake pressure that is applied to the right rear wheel or the left rear wheel on the basis of the sign (positive or negative) of the difference (β−β*).

Figure 5:
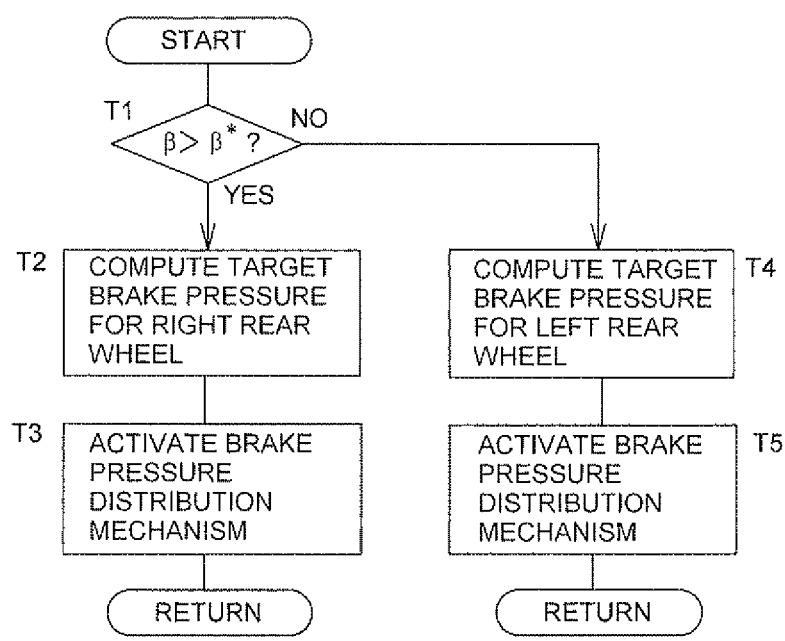
FIG. 5 is a flowchart that shows the procedure of applying attitude control brake pressure to a right rear wheel or a left rear wheel on the basis of the sign of a difference between an estimated sideslip angle and a target sideslip angle.

FIG. 5 is a flowchart that shows the procedure in step S5. When the difference (β−β*) is larger than 0 ((β−β*)>0) (Yes in step T1), the actual velocity vector of the vehicle body deviates leftward from the target velocity vector of the vehicle, which defines the target sideslip angle β*. Therefore, a target brake pressure Prr for the right rear wheel is computed (step T2). The fact that the difference (β−β*) is larger than 0 ((β−β*)>0) means that the actual sideslip angle β of the vehicle body is larger in the positive direction (leftward) than the target sideslip angle, and therefore the vehicle body is oriented to the left with respect to the target orientation. Therefore, the brake pressure for the right rear wheel is set larger than the initial brake pressure (step T3). The brake pressure Prr for the right rear wheel to be set is calculated according to Equation 7 indicated below.

$$Prr = P0 + Gbr|\beta - \beta^*| \qquad \text{Equation 7}$$

Here, P0 denotes an initial brake pressure, and Gbr denotes a gain coefficient of a sideslip angle β, which is a function of a yaw rate γ and a lateral acceleration α and which is considered to occur from a set brake pressure, the gain coefficient being determined based on a target response.

When the difference (β−β*) is smaller than 0 ((β−β*)<0) (No in step T1), the actual velocity vector of the vehicle body deviates rightward from the target velocity vector of the vehicle, which defines the target sideslip angle β*. Therefore, a target brake pressure Prl for the left rear wheel is computed (step T2). In this case, the actual sideslip angle β of the vehicle body is larger in the negative direction (rightward) than the target sideslip angle, and therefore the vehicle body is oriented to the right with respect to the target orientation. Therefore, the brake pressure for the left rear wheel is set larger than the initial brake pressure (step T5). The brake pressure Prl for the left rear wheel to be set is calculated according to Equation 8 indicated below.

$$Prl = P0 + Gbr|\beta - \beta^*| \qquad \text{Equation 8}$$

As described above, vehicle attitude control is executed such that the vehicle body sideslip angle β is brought to the target sideslip angle β*. When the actual sideslip angle β of the vehicle body differs from the target sideslip angle, the brake pressure for the right rear wheel or the left rear wheel is increased. Thus, the vehicle neither understeers nor oversteers. As a result, it is possible to turn the vehicle as intended by the driver.

The invention is not limited to the above-described embodiment. In the above-described embodiment, brake pressure control is executed over the rear wheels in order to execute vehicle attitude control using a corrected target sideslip angle. Alternatively, brake pressure control over the four wheels including the front wheels may be executed. In addition, in a four wheel drive vehicle, driving force distribution control over right and left rear wheels may be employed or driving force distribution control over four wheels including front wheels may be employed. Other than the above, various modifications may be made within the scope of the invention.

What is claimed is:

1. A vehicle attitude control system, comprising:
a processor programmed to:
compute a target sideslip angle βs used when a vehicle makes a turn, based on a steering angle and a vehicle speed;
correct the computed target sideslip angle βs, the corrected target sideslip angle β* being calculated using a sideslip angle correction amount (Δβδ', ΔβA, ΔβA', and ΔβP) calculated based on a steering angular velocity δ', a depression amount of an accelerator pedal A, a depression velocity of the accelerator pedal A', a depression amount of a brake pedal P, and weighing coefficients G, H, I, and J using the equation $$\beta^* = \beta s + G\Delta\beta\delta' + H\Delta\beta A + I\Delta\beta A' + J\Delta\beta P;$$

estimate an actual vehicle body sideslip angle based on a yaw rate detected by a yaw rate sensor and a lateral acceleration detected by a later acceleration sensor; and
execute vehicle attitude control using the corrected target sideslip angle β* and the actual vehicle body sideslip angle.

2. The vehicle attitude control system according to claim 1, further comprising:
a sensor that detects a turning direction of the vehicle, wherein the computed sideslip angle correction amount has a sign that varies depending on the turning direction of the vehicle.

3. The vehicle attitude control system according to claim 1, wherein processor calculates the sideslip angle correction amount based on the steering angular velocity only when an absolute value of the steering angular velocity exceeds a predetermined threshold.

4. The vehicle attitude control system according to claim 1, wherein the processor calculates the sideslip angle correction amount based on the depression amount of the accelerator pedal only when the depression amount of the accelerator pedal exceeds a predetermined threshold.

5. The vehicle attitude control system according to claim 1, wherein the target processor calculates the sideslip angle correction amount based on the depression velocity of the accelerator pedal only when an absolute value of the depression velocity of the accelerator pedal exceeds a predetermined threshold.

6. The vehicle attitude control system according to claim 1, wherein the processor calculates the sideslip angle correction amount based on the depression amount of the brake pedal only when the depression amount of the brake pedal exceeds a first predetermined threshold.

7. The vehicle attitude control system according to claim 1, wherein the processor calculates the sideslip angle correction amount based on the depression amount of the brake pedal only when the depression amount of the brake pedal falls within a range from a first predetermined threshold to a second predetermined threshold.

8. The vehicle attitude control system according to claim 1, wherein the processor is programmed to control brake pressures for four wheels based on the target sideslip angle.

* * * * *